United States Patent [19]

Skoglund

[11] Patent Number: 5,143,116
[45] Date of Patent: Sep. 1, 1992

[54] FLOW REGULATING VALVE AND SYSTEM USING THE SAME

[76] Inventor: Paul K. Skoglund, P.O. Box 848, Woodinville, Wash. 98072

[21] Appl. No.: 708,098

[22] Filed: May 24, 1991

Related U.S. Application Data

[63] Continuation-in-part of Ser. No. 540,297, Jun. 6, 1990, abandoned, which is a continuation-in-part of Ser. No. 448,552, Dec. 11, 1989, abandoned.

[51] Int. Cl.$^5$ .................................... F16K 31/363
[52] U.S. Cl. .................................... 137/487; 137/487.5; 137/501
[58] Field of Search ............... 137/501, 500, 497, 486, 137/487.5, 557, 487

[56] References Cited

U.S. PATENT DOCUMENTS

| | | | |
|---|---|---|---|
| 2,655,935 | 10/1953 | Kinzbach | 137/538 |
| 2,916,047 | 12/1959 | Butcher | 137/501 |
| 3,344,805 | 10/1967 | Wapner | 137/501 X |
| 3,357,448 | 12/1967 | Martin | 137/501 |
| 3,433,262 | 3/1969 | Ray | 137/505.41 X |
| 3,446,227 | 5/1969 | Grayson | 137/505.41 X |
| 3,478,776 | 11/1969 | Royer | 137/505.41 X |
| 3,502,100 | 3/1970 | Jonson | 137/501 X |
| 3,586,036 | 6/1971 | Barnes | 137/501 X |
| 3,590,861 | 7/1971 | Chittenden et al. | 137/501 |
| 3,593,742 | 7/1971 | Taylor | 137/504 |
| 3,729,018 | 4/1973 | Butterfield | 137/501 X |
| 3,741,242 | 6/1973 | Hansen et al. | 137/504 |
| 3,958,596 | 5/1976 | Garrard | 137/504 |
| 4,016,905 | 4/1977 | Marlatt, Sr. | 137/505.41 X |
| 4,059,128 | 11/1977 | Heske et al. | 137/487.5 |
| 4,074,693 | 2/1978 | Kates | 137/501 X |
| 4,092,998 | 6/1978 | Taplin | 137/501 X |
| 4,098,285 | 7/1978 | Karing | 137/501 X |
| 4,168,719 | 9/1979 | Renshaw | 137/505.41 X |
| 4,175,584 | 11/1979 | Rikuta | 137/504 |
| 4,230,147 | 10/1980 | Booth et al. | 137/504 |
| 4,250,914 | 2/1981 | Ferrentino | 137/501 |
| 4,277,832 | 7/1981 | Wong | 137/487 X |
| 4,508,140 | 4/1985 | Harrison | 137/501 |
| 4,541,454 | 9/1985 | Sturman et al. | 137/505.41 |
| 4,570,677 | 2/1986 | Roxton et al. | 137/557 X |
| 4,665,938 | 5/1987 | Brown et al. | 137/487.5 X |
| 4,724,865 | 2/1988 | Hirano et al. | 137/487.5 X |
| 4,796,661 | 1/1989 | Hishinuma et al. | 137/487.5 |
| 4,893,649 | 1/1990 | Skoglund | 137/504 |

FOREIGN PATENT DOCUMENTS

77/2626  2/1978  South Africa.

OTHER PUBLICATIONS

"A Novel Approach to Flow Control for Chemical Injection and Continuous Sampling", M. S. Shelton, Society of Petroleum Engineers Publication No. 16910, pp. 329-338, Sep., 1987.

(List continued on next page.)

Primary Examiner—John Rivell
Attorney, Agent, or Firm—Graybeal Jackson Haley & Johnson

[57] ABSTRACT

A substantially constant flow regulating valve includes a piston dividing a bore into two chambers. The piston is spring biased toward the top chamber of the bore. Fluid from the inlet enters the top chamber through a reference pressure passage and exerts a downward force on the piston. Fluid from the inlet also passes through a low torque inlet flow throttle and into the bottom chamber of the bore where it exerts an upward force on the piston in concert with the spring force. The piston includes an end which variably interacts with an orifice in the lower chamber to maintain a constant pressure differential between the top and bottom chambers. A coil-type piping system, a diversifying campus-type piping system and a pressure source piping system all include the above described flow regulating valve. None of these systems require balancing valves or differential pressure valves when the flow regulating valve is employed.

33 Claims, 9 Drawing Sheets

OTHER PUBLICATIONS

"Automatic Flow Rate Controllers", Kates Company, a Taub Company, date unknown.

Primary Secondary Pumping Manual–ITT Corporation (1968).

Variable Speed/Variable Volume Pumping Fundamentals–ITT Corporation (1985).

A Chilling Story of the Bridge–BRDG-TNDR Corporation, date unknown.

Design ED, EAS and EDR Control Valve Bodies–Fisher Corporation–Bulletin 51.1, Sep. 1987; Bulletin 61.1, Mar. 1983; Bulletin 62.1, Apr. 1989.

Flow Control brochure–Westinghouse Corporation, date unknown.

Air Handling Unit–Coil Piping 3-Way Valve Control–source unknown, date unknown.

Specification Sheet No. 428DP-CP–Bailey Corporation, date unknown.

Two-way Valve Cast Iron Flanged–Sauter Corporation, date unknown.

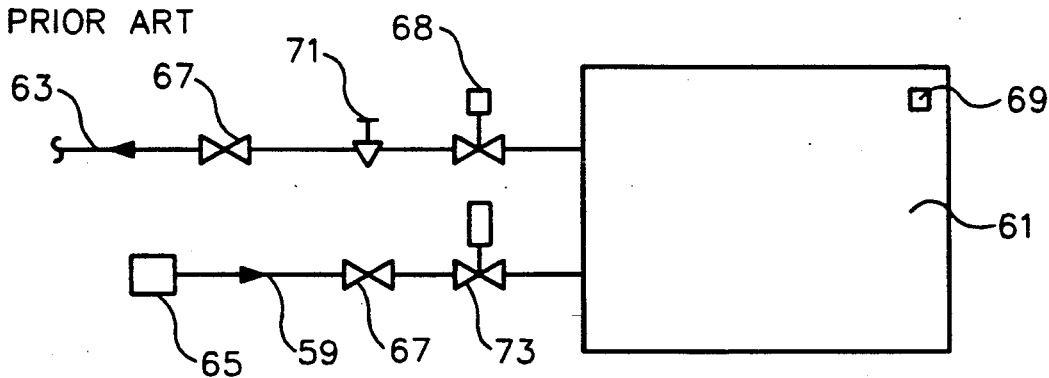
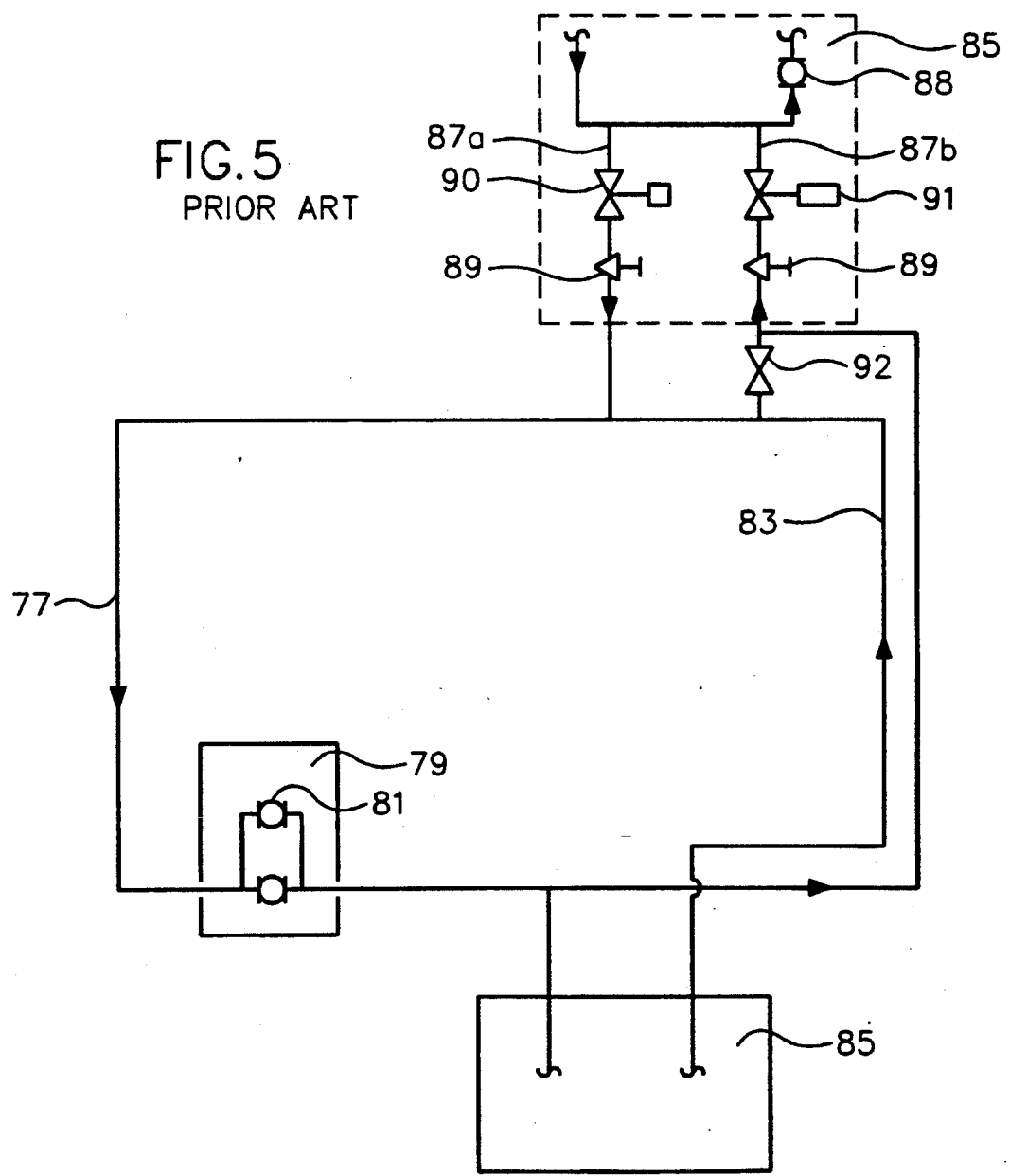

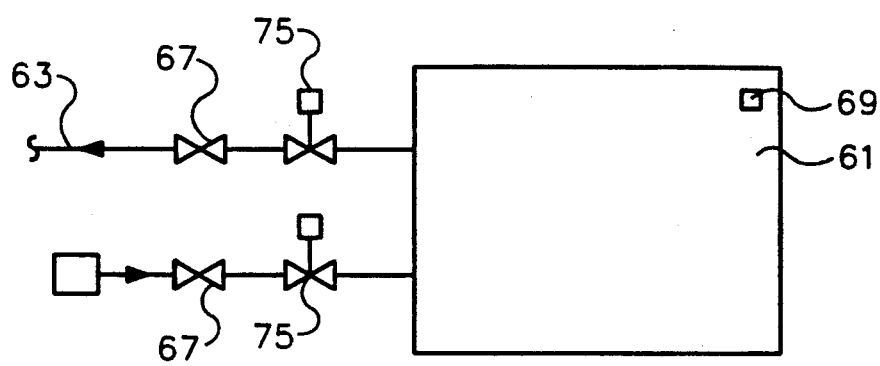
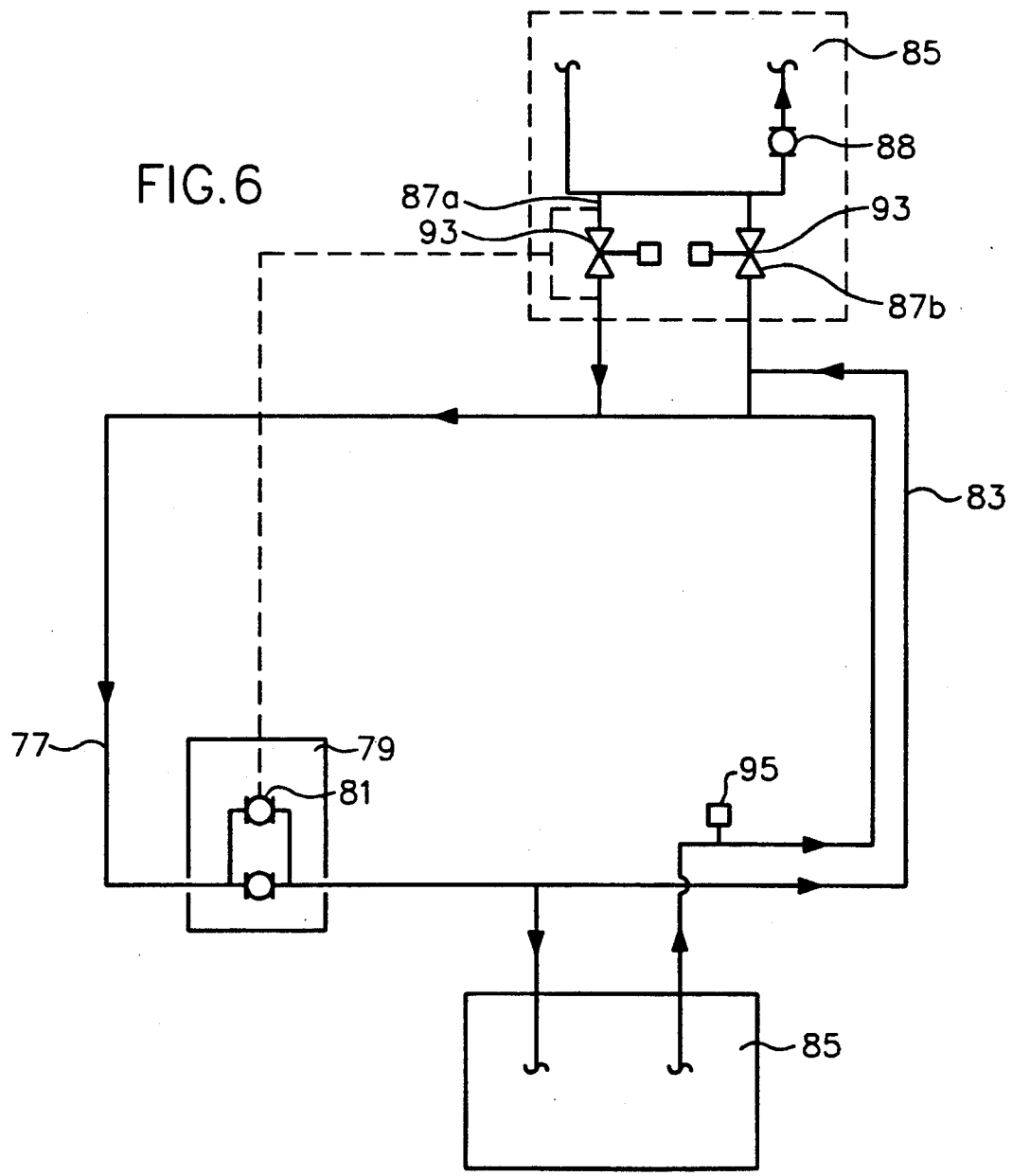

FLOW REGULATING VALVE AND SYSTEM USING THE SAME

This application is a continuation-in-part of application Ser. No. 07/540,297, filed Jun. 6, 1990, now abandoned, which is a continuation-in-part of application Ser. No. 07/448,552 filed Dec. 11, 1989, now abandoned the benefit of the filing dates of which are hereby claimed under 35 USC 120.

BACKGROUND OF THE INVENTION

The present invention relates to valves for regulating fluid flow at a substantially constant and known rate and also relates to fluid piping systems employing these fluid flow regulating valves. The valve of the present invention provides a substantially constant known fluid flow of a wide range (from 0.1 to over 10,000 gallons per minute) under extreme operating parameters where the pressure differential between the upstream and downstream pressures is large (up to 20,000 psi) or small (between 1 to 100 psi.

Flow regulating valves are known in the art. For example, the valve of South African Patent No. 77/2626 comprises a valve body having a through cavity, entrance and exit apertures, and an opening with variable opening area for varying the liquid flow rate through the valve. Inside the through cavity there is a membrane that divides the cavity into two sealed compartments. A conduit is provided inside the valve body which acts as a fluid communication link between the two compartments. Fluid flow control means in the conduit operates means for varying the size of the opening. Specifically, fixed to the base of the membrane is a conical-shaped plunger that can be inserted into the opening and spring means urging the plunger away from the opening.

The South African valve, however, unlike the present invention, is not able to provide substantially constant flow under extreme operating parameters.

Also known in the art is U.S. Pat. No. 4,250,914, which discloses a valve for controlling fluid flow having a cavity divided into first and second chambers by a first membrane carrying a plunger. The plunger has one end extending into the valve outlet opening at one wall of the first chamber. A second membrane acts between an end of the plunger and a wall of the second chamber and forms a third chamber in communication with fluid at the outside of the opening through a longitudinal conduit in the plunger. Inlet fluid is supplied to the first and second chambers by a manually operable flow control valve. The plunger position is dependent upon the difference in fluid pressures in the first and second chambers and varies the size of the opening. Fluid in the third chamber counterbalances the pressure of the fluid at the outlet on the end of the plunger.

Neither the valve of U.S. Pat. No. 4,250,914 nor the valve of South African Patent No. 77/2626 teach the low torque inlet flow throttle of the present invention. This low torque throttle provides linear or non-linear flow regulation, can be easily adjusted with comparatively less force or torque, and uses a low power motor when motor driven, unlike conventional flow control throttles.

Also, neither of the above patents disclose a flow restriction point in a reference pressure passage as does the present valve. This flow restriction point minimizes "fluid packing" to allow valve responsiveness to be precisely adjusted over a wide range of flow rates despite fluctuating inlet pressures.

Also known in the art is U.S. Pat. No. 3,357,448 issued to Martin and disclosing a constant flow valve of small size. Unlike the present invention, in order to obtain constant flow the small valve of Martin requires that the effective pressure area at the top of the piston be substantially larger than the cross-sectional area of the outlet. Due to this requirement, the Martin valve is limited to a relatively small size. In contrast, the valve of the present invention may be of any size able to service a pipe having a diameter from ¼ inch to 200 inches because it does not require that the effective pressure area at the top of the piston be much larger than the cross-sectional area of the outlet. Instead, to maintain constant flow, the effective pressure area at the top of the piston can be any size in relation to the cross-sectional area of the outlet as long as this effective pressure area at the top of the piston equals the cross-sectional area of the cylinder containing the piston less the cross-sectional area of the cylinder outlet opening.

The prior art does not show valves which modify fluid piping systems to function without balancing valves and differential pressure valves and the accompanying energy-waste due to the additional pumping pressure required by the balancing and differential pressure valves.

Furthermore, the valve of the present invention, unlike the prior art, allows the supply and return pipes of piping systems to be sized more precisely to the actual maximum flow rates encountered. Thus less fluid flow is required in a piping system using the valve of the present invention than in prior art systems. Less fluid flow results in a more energy efficient system because pump size and pump energy are functions of fluid flow volume and pressures. Specifically, one-eighth of the horse power required to circulate 1000 gallons of fluid is needed to circulate 500 gallons of fluid through the same system. On a national scale, 65 percent of the energy consumed in the United States is used to operate centrifugal or flow loads such as pumps, fans, blowers or compressors.

SUMMARY OF THE INVENTION

The present invention pertains to a valve for regulating fluid flow at a substantially constant rate under varying external pressures. In accordance with the present invention, a valve is divided into a primary body having a bore connected to an outlet, and a secondary body having a cavity connected to an inlet. A piston is located within the bore and divides the bore into a first chamber and a second chamber. The first chamber of the bore is connected to the cavity of the secondary body by a reference pressure passage. Fluid of a first pressure $P_1$ flows from the inlet into the cavity, through the reference pressure passage and into the first chamber of the bore. The reference pressure passage includes a flow restriction point for varying the valve responsiveness to inlet pressure fluctuation.

The second chamber of the bore is connected to the outlet and is also connected to the cavity of the secondary body by an opening having a variable flow cross section. The flow cross section of this opening is varied by a low torque inlet flow throttle which includes a shaft, a control plate attached to the shaft, and a spring biasing the control plate against the opening. The control plate has an opening which variably intersects with the opening connecting the cavity to the second chamber as the shaft of the inlet flow throttle is rotated. Fluid of pressure $P_1$ flows from the inlet into the cavity, through the low torque inlet flow throttle.

The piston is biased toward the first chamber of the bore, in opposition to fluid pressure $P_1$, by one or more springs on a piston seat plate. The piston seat plate has an opening connecting the second chamber and the outlet. The piston has an end sized to allow the flow through this opening to fluctuate such that $P_2$, the pressure in the second chamber, remains constant. Thus a constant pressure differential exists between the first and second chambers. The piston end maintains a constant pressure in the second chamber by varying the flow cross section of the piston seat opening. The fluid flow through the piston seat opening thus varies as the piston moves within the bore. As fluid flows along the outlet, the fluid has an outlet pressure of $P_3$.

Coil-type piping systems employing the flow regulating valve of the present invention include supply pipes and return pipes connected to a coil pipe unit. The flow regulating valve is located on the supply pipe and/or the return pipe. A circulation unit on the supply pipe circulates the fluid through the system. A sensor senses one, or a combination of, temperature, humidity and pressure variables and controls the flow regulating valves on the supply and/or return pipes. Balancing valves and differential pressure valves are not required in this system.

Diversifying campus-type piping systems employing the flow regulating valve of the present invention include a supply pipe and a return pipe connected to a central plant having a circulation unit. Additional piping attaches a plurality of destination points to both the supply pipe and the return pipe. Flow regulating valves are located on the additional piping connecting the supply pipe and/or the return pipe adjacent. A differential pressure sensor monitors the line pressure at the destination point farthestmost from the central plant and controls the circulation unit to maintain the minimum pressure to operate the system at varying load conditions. Balancing valves and differential pressure valves are not needed in this system.

Pressure source piping systems using the flow regulating valve of the present invention include a pressure source connected to a plurality of arterial pipes by a supply main. Flow regulator valves are located on the arterial pipes between shut-off valves. Balancing valves and differential pressure valves are not needed in this system.

DESCRIPTION OF THE DRAWINGS

To provide a complete disclosure of the invention, reference is made to the appended drawings and following description of preferred and alternative embodiments.

FIG. 3 is a schematic view of a conventional coil piping system;

FIG. 4 is a schematic view of a coil piping system having the flow regulating valve of the present invention;

FIG. 5 is a schematic view of a conventional campus-type primary-secondary piping system;

FIG. 6 is a schematic view of a diversifying campus type primary-secondary piping system having the flow regulating valve of the present invention;

DESCRIPTION OF THE PREFERRED EMBODIMENT

The novel features believed to be characteristic of this invention are set forth in the appended claims. The invention itself, however, may best be understood and its various objects and advantages best appreciated by reference to the detailed description below in connection with the accompanying drawings.

Figure 1:
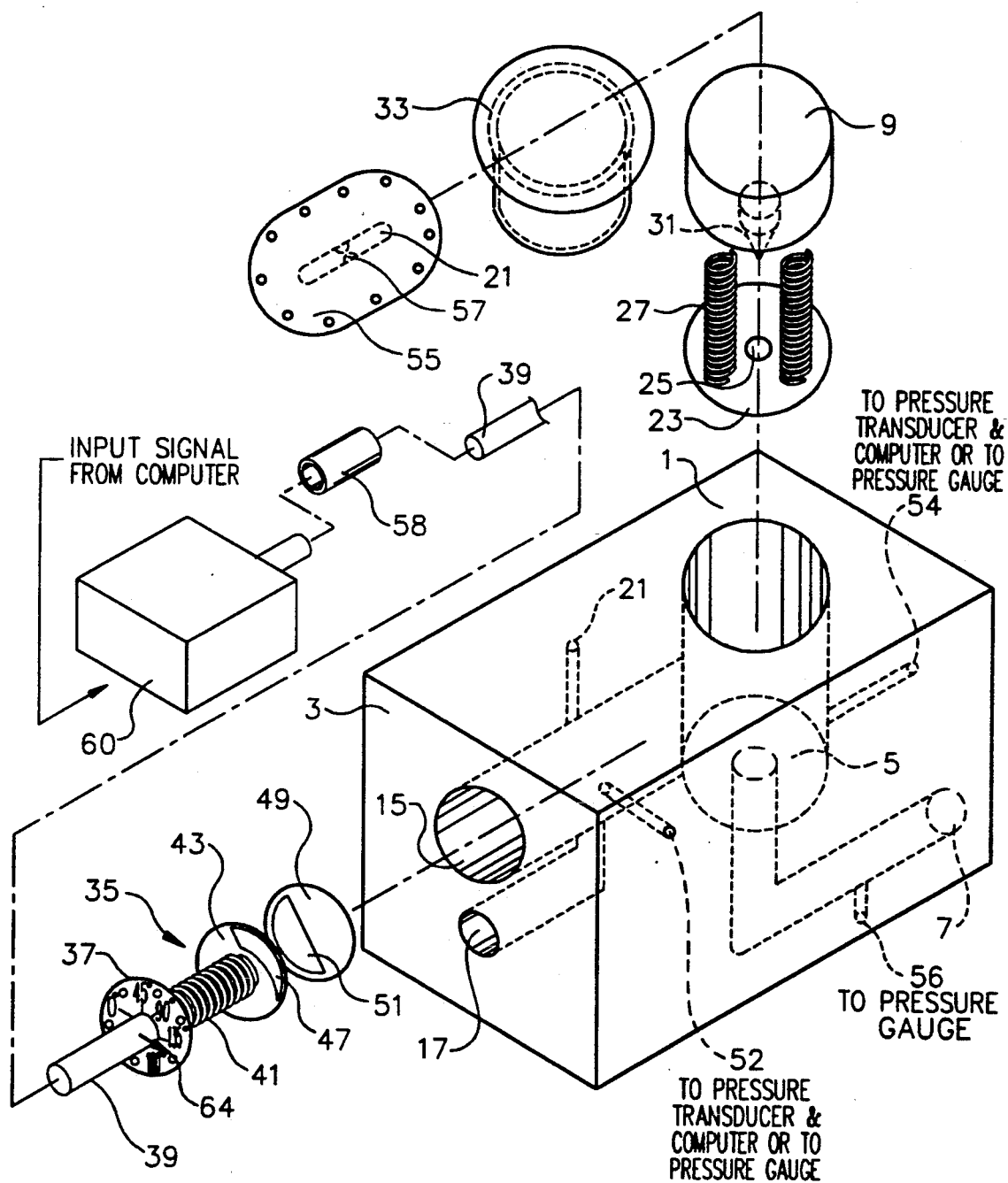
FIG. 1 is an exploded perspective view of the flow regulating valve of the present invention.
Figure 2:
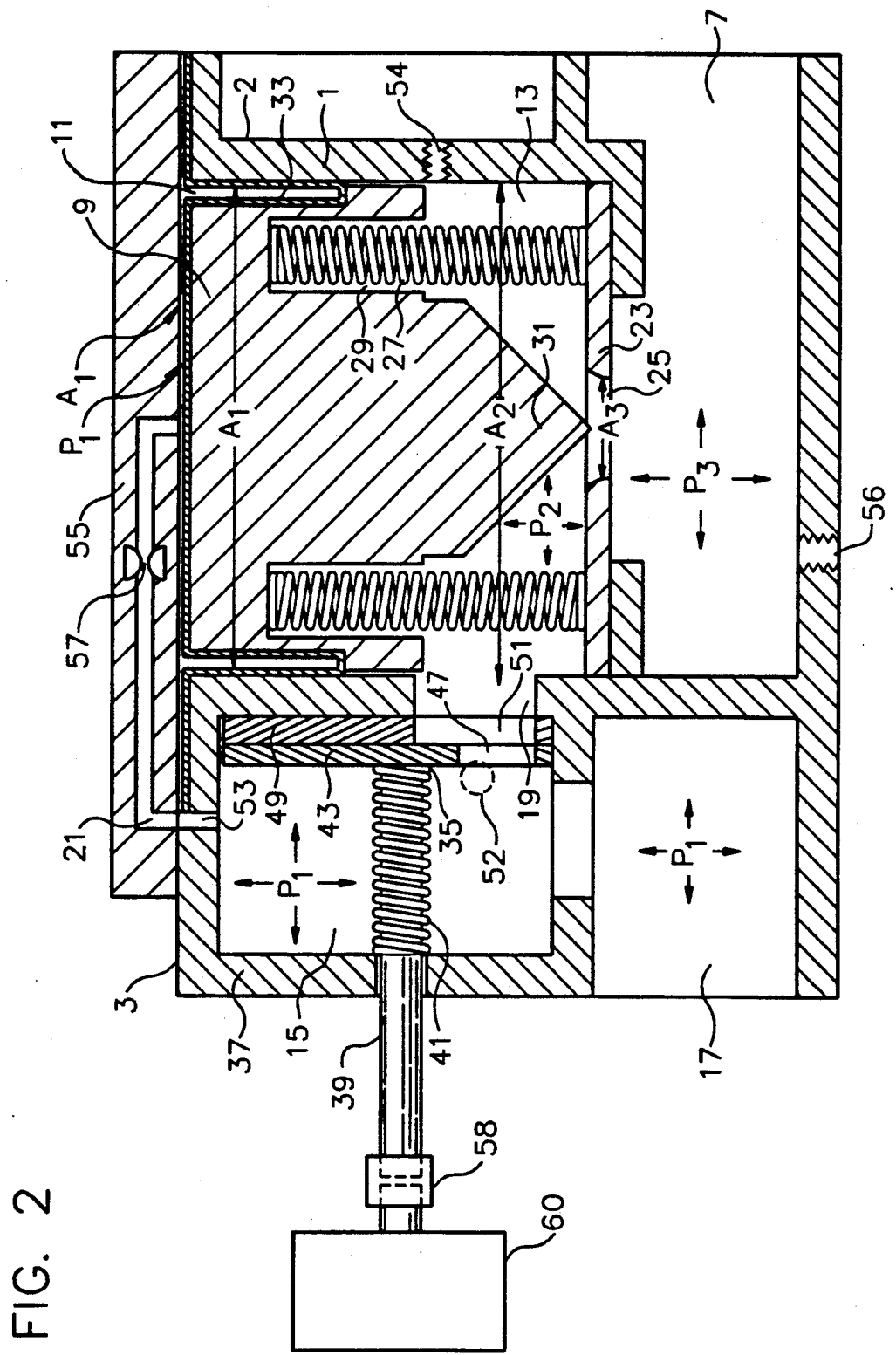
FIG. 2 is a cross-sectional view of the flow regulating valve of the present invention employing a diaphragm seal.

Referring to FIGS. 1 and 2, the valve of the present invention includes a primary body 1 and a secondary body 3. The primary body 1 includes a bore 5 connected to the outlet port 7. Piston 9 is disposed within bore 5 such that a portion of bore 5 is divided into a first chamber 11 above piston 9 and a second chamber 13 below piston 9.

The secondary body 3 includes a cavity 15 connected to both bore 5 of primary body 1 and the inlet port 17. The connection of cavity 15 of the secondary body 3 with bore 5 of the primary body 1 is through both throttle opening 19 and reference pressure passage 21. Specifically, reference pressure passage 21 connects first chamber 11 of bore 5 to cavity 15 of secondary body 3. Also, throttle opening 19 connects second chamber 13 of bore 5 to cavity 15 of secondary body 3.

Referring in detail to bore 5 of primary body 1, piston seat plate 23 is located in the bottom portion of the second chamber 13 of bore 5. Piston seat plate 23 has an opening 25 connected to outlet port 7 through which fluid in secondary chamber 13 passes. Piston seat plate 23 may be either integral with bore 5 or a separate element therefrom.

A spring or a plurality of springs 27 are situated on piston seat plate 23. Springs 27 also contact piston 9, preferably residing in spring holes 29 of piston 9, such that springs 27 bias piston 9 towards first chamber 11 of bore 5. The spring force provided by springs 27 sets the differential between the fluid pressures in the first chamber 11 and cavity 15 ($P_1$) and the fluid pressure in the second chamber 13 ($P_2$). The number and spring force of each of springs 27 can be changed to vary the aggregate spring force biasing piston 9 towards first chamber 11 to alter the differential pressure across the control valve.

Piston 9 includes end 31 which seats in opening 25 and which is shaped to vary the effective cross-sectional flow area of opening 25 of seat plate 23 as the relative position of piston 9 changes within bore 5. End 31 has a cross-sectional area substantially less than the cross-sectional area of the bore 5. Different piston seat plates 23 having openings 25 of varying sizes may be employed to alter the valve's responsiveness to downstream pressure fluctuations.

Seal 33 is a diaphragm seal located in first chamber 11 of bore 5 around the upper side portion and the top portion of piston 9. Seal 33 prevents fluid leakage from first chamber 11 into second chamber 13. Seal 33 can also be another type of seal, such as an O-ring type seal or a cup seal. A cup seal may be employed for high pressures (e.g. above 1000 pounds).

Referring in detail to secondary body 3, cavity 15 contains inlet flow throttle 35 for regulating the fluid flow rate. Inlet flow throttle 35 is comprised of a cover plate 37, shaft 39, spring 41 and control plate 43. Cover plate 37 forms a wall of secondary body 3. Shaft 39 passes through cover plate 37 to allow rotation of shaft 39 by the valve operator. Control plate 43 is connected to the end of shaft 39 within cavity 15. Spring 41 fits over shaft 39 and contacts the inner wall of cover plate 37 such that the spring force of spring 41 biases control plate 43 against throttle opening 19, which connects cavity 15 with second chamber 13 of bore 5. Control plate 43 includes control plate opening 47 which is located asymmetrically with respect to the axis formed by shaft 39. Control plate opening 47 is sized and shaped to vary the effective flow cross section of throttle opening 19 as shaft 39 is rotated. This variation of the effective flow cross section of throttle opening 19 occurs because the rotation of control plate 43 via shaft 39 causes rotation of control plate opening 47 which varies the area of intersection of control plate opening 47 and throttle opening 19. Optionally, back plate 49 is located between control plate 43 and throttle opening 19. Back plate 49 may be integral with cavity 15 or separate therefrom. Back plate 49 includes a hole 51 which decreases the size and/or varies the shape of throttle opening 19 to further alter the affect of inlet flow throttle 35 on the inlet flow rate. Note that control plate opening 47 of inlet flow throttle 35 can be sized to provide either a linear or non-linear flow rate change per degree of rotation of control plate 43. While inlet flow throttle 35 can be adjusted by hand due to the low torque involved, a motor can also be employed to obtain automatic flow rate control. When a motor is used, the low torque on the inlet flow throttle 35 requires only a low power motor which has a relatively small level of energy consumption. Torque on inlet flow throttle 35 is low due to the small pressure differential between cavity 15 and second chamber 13.

Cavity 15 of secondary body 3 also includes reference opening 53 which connects cavity 15 to reference pressure passage 21. As stated above, reference pressure passage 21 connects cavity 15 and first chamber 11 of bore 5. Preferably reference passage 21 is located in valve lid 55, a part of which forms the top surface of bore 5. Reference pressure passage 21 includes flow restriction point 57, which is a narrowing of reference pressure passage 21. Flow restriction point 57 adjusts the delay in response time of the flow regulating valve to upstream pressure fluctuations by restricting the flow of the fluid between chamber 11 and cavity 15. The area of chamber 11 is kept to a minimum to minimize the amount of "fluid packing". "Fluid packing" relates to the compressability of a fluid. If less fluid is present, less fluid compression and "fluid packing" will occur, and the response time of the valve components to pressure fluctuations will be more precise. The effective cross-sectional fluid flow of flow restriction point 57 can be varied to acquire the desired degree of valve responsiveness.

Narrowed flow restriction point 57 is able to adjust fluid flow, and thus control valve responsiveness during fluctuations of fluid pressure at inlet port 17, due to the relatively small cross-sectional area of narrowed flow restriction point 57 in relation to the surface area of piston 9 in first chamber 11 (area $A_1$). Specifically, narrowed flow restriction point 57 is preferably from about 0.01% to about 0.25% of area $A_1$. In contrast, valves having a reference passage that is 1.0% or more of the surface area of a piston comparable to piston 9 do not markedly affect valve responsiveness due to this larger reference pressure passage (for example, U.S. Pat. No. 3,357,448 issued to Martin).

Figure 2A:
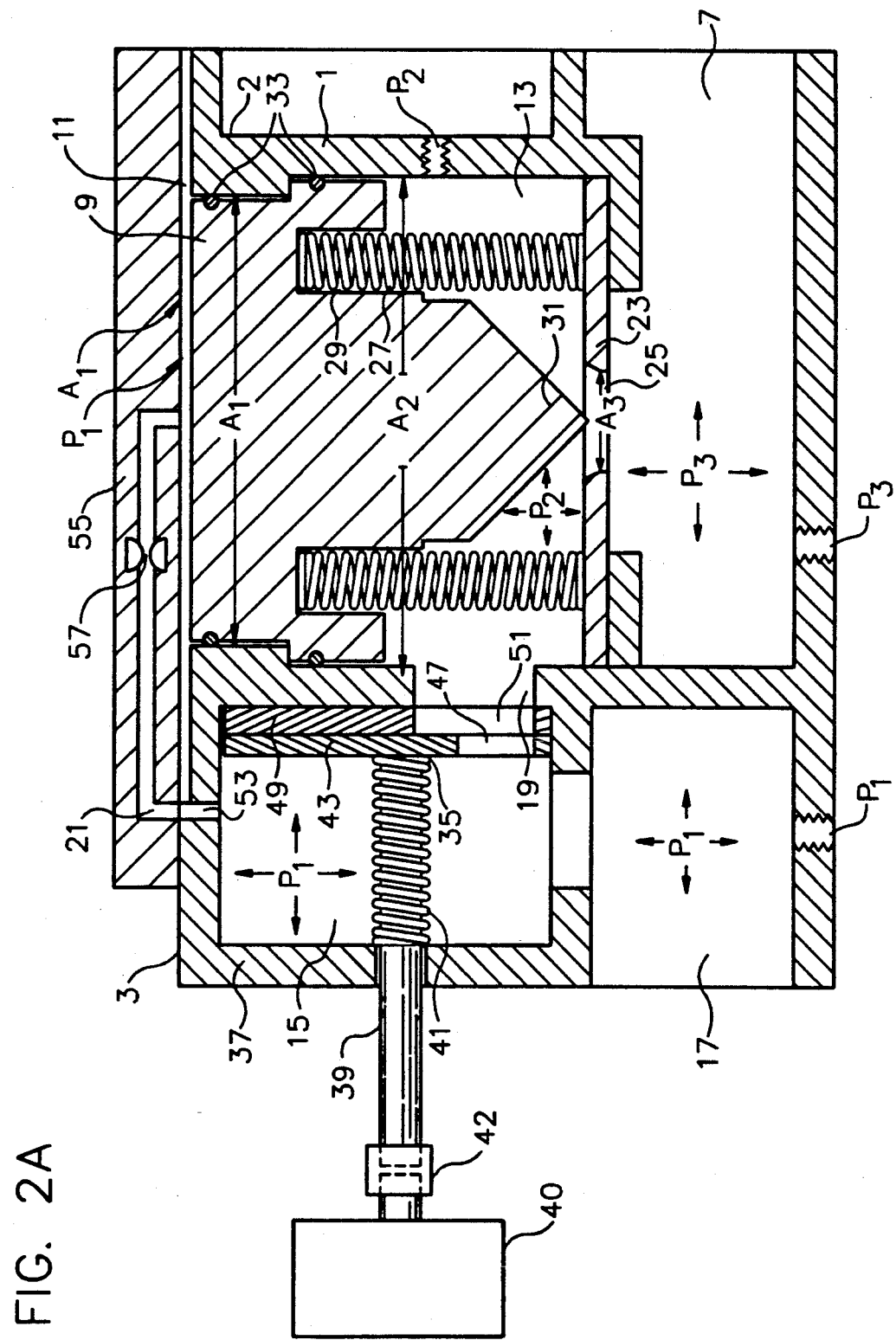
FIG. 2A is a cross-sectional view of the flow regulating valve of the present invention employing cup or O-ring seals.
Figure 2B:
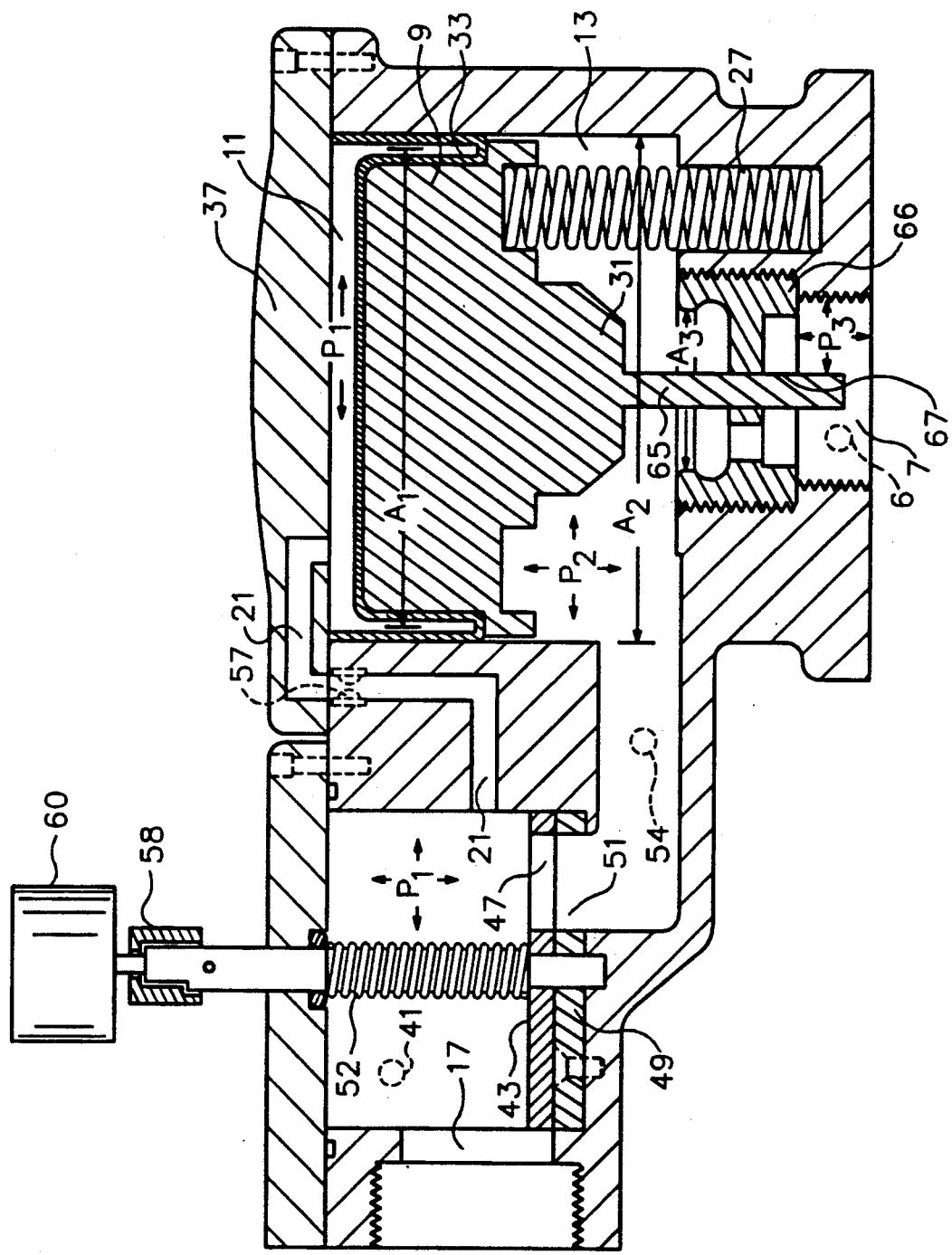
FIG. 2B is a cross-sectional view of a first embodiment of the present invention employing a piston guide.

Referring now to FIG. 2B, the valve of the present invention, in one embodiment, includes piston guide rod 65 fixedly connected to end 31 of piston 9 and passing into outlet port 7. Guide rod collar 66 is fixedly secured, in outlet port 7. Guide rod collar 66 includes guide rod opening 67 oriented to slidably receive piston guide rod 65. Thus, reciprocation of piston 9 in bore 5 is guided by reciprocation of guide rod 65 in guide rod opening 67 of guide rod collar 66. In this manner, piston 9 is stabilized in bore 5 during reciprocation, and piston 9 can function over a longer stroke than comparable pistons not employing a guide rod and guide rod collar.

Figure 2C:
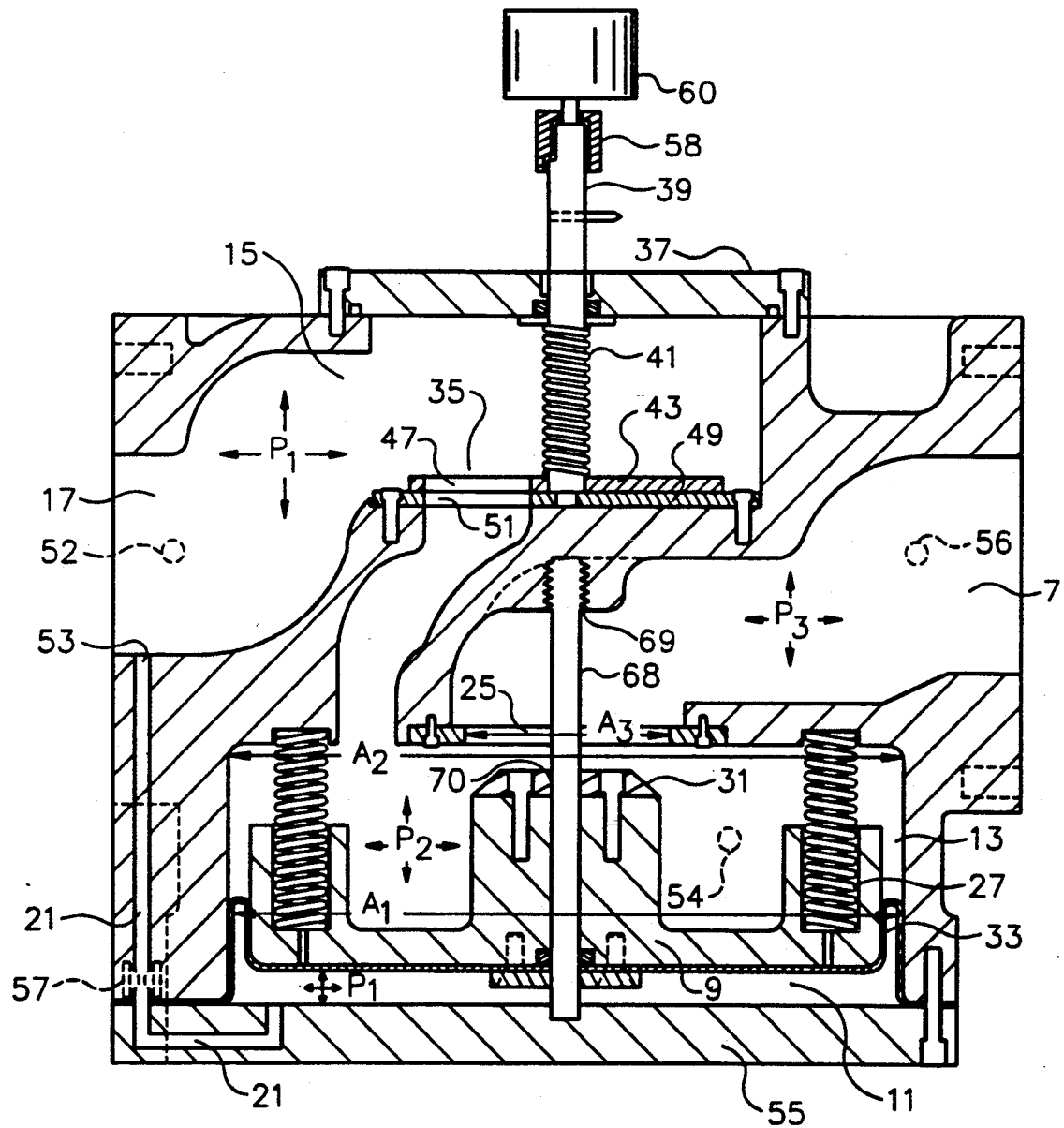
FIG. 2C is a cross-sectional view of a second embodiment of the present invention employing a piston guide.

Referring now to FIG. 2C, the valve of the present invention, in an alternate embodiment, includes guide rod 68 fixedly connected at an end to valve lid 55 and sealed therewith by gaskets known in the art. The opposite end of guide rod 68 is fixedly attached, preferably by threading, to shoulder 69. Piston 9 includes guide rod opening 70 therethrough such that piston 9 is slidable along guide rod 68 when guide rod 68 passes through guide rod opening 70. Thus, reciprocation of piston 9 in bore 5 is guided by reciprocation of piston 9 on guide rod 68. In this manner, piston 9 is stabilized in bore 5 during reciprocation, and piston 9 can function over a longer stroke than comparable pistons not employing a guide road through a piston guide opening.

Figure 2D:
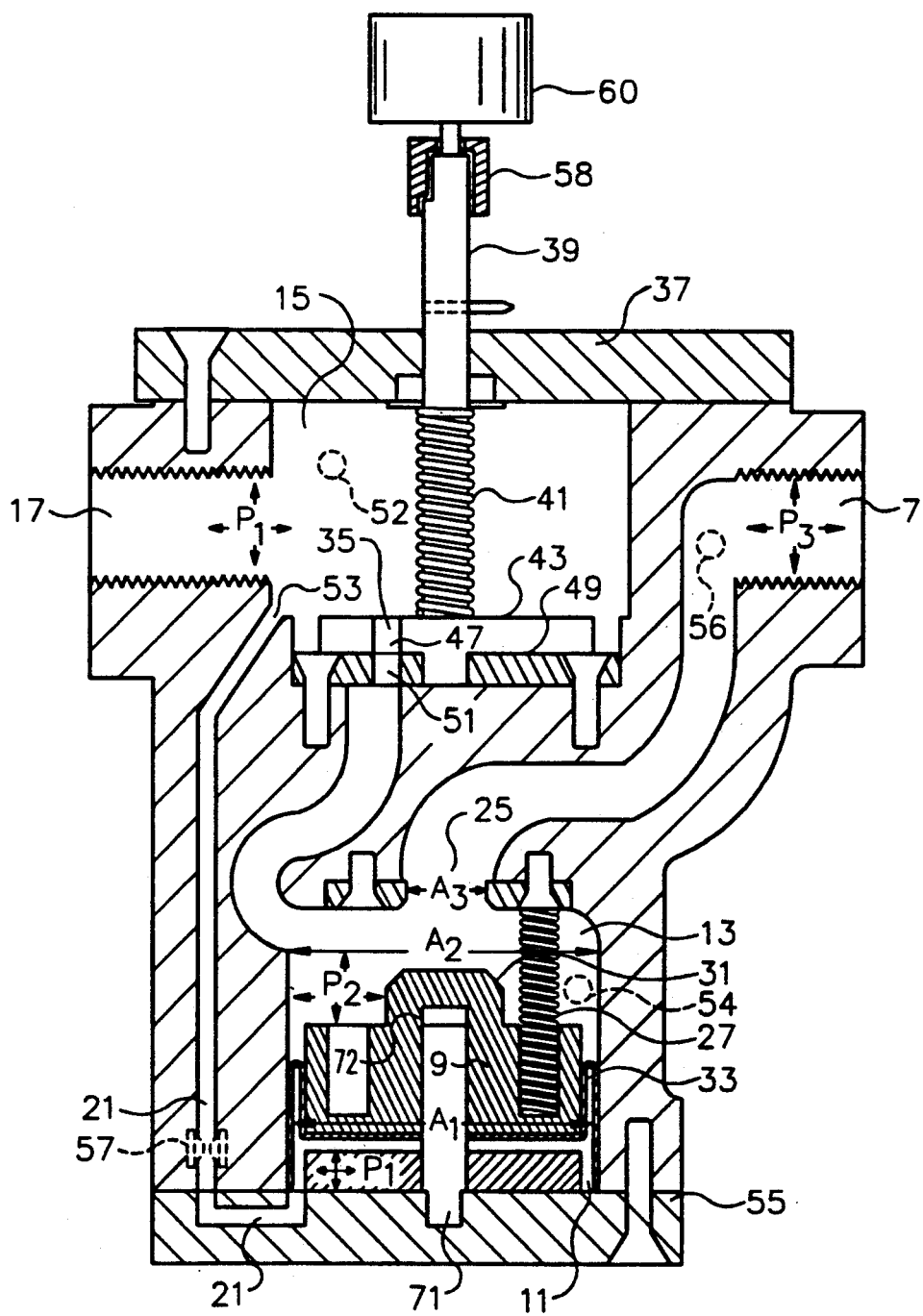
FIG. 2D is a cross-sectional view of a third embodiment of the present invention employing a position guide.

Referring now to FIG. 2D, the valve of the present invention, in a third embodiment, includes guide rod 71 fixedly connected at an end to valve lid 55 and sealed therewith by gaskets known in the art. The opposite end of guide rod 71 slidably mounts in piston cavity 72 in the upper end of piston 9. Note that piston cavity 72 does not pass through piston 9, but instead terminates in a seat in piston 9 in which an end of guide rod 71 resides. Springs 27 bias piston 9 toward guide rod 71, and piston 9 reciprocates on guide rod 71. In this manner, piston 9 is stabilized during reciprocation.

The flow regulating valve of the present invention operates based on the following force balance equations:

$$P_1 A_1 = P_2 A_2 + KX + P_3 A_3 \qquad (1)$$

where $P_1$ = pressure in first chamber 11 and cavity 15.

$A_1$ effective pressure = area on piston 9 surface in first chamber 11 measured to one-half the difference between the cross-sectional area of bore 5 when employing a diaphragm seal (FIG. 2), and measured to the wall of first chamber 11 when employing an O-ring or cup seal (FIG. 2A).

$P_2$ = pressure in second chamber 13

$A_2$ cross-sectional = area of second chamber 13 of bore 5 excluding piston end 31
$KX$ = force of springs 27
$P_3$ = pressure at outlet port 7
$A_3$ = area of piston end 31 (or outlet area)
Thus, $$P_1 A_1 - P_2 A_2 = P_3 A_3 + KX \quad (2)$$

If $$A_1 \approx A_2 = A_{1=2} \quad (3)$$

Then $$P_1 - P_2 (A_{1=2}) = P_3 A_3 + KX \quad (4)$$

and $$P_1 - P_2 = \frac{P_3 A_3 + KX}{A_{1=2}} \quad (5)$$

Thus, the pressure differential $(P_1-P_2)$ between first chamber 11 and second chamber 13 is substantially a function of spring force $KX$, which is constant. Also, $A_1$, $A_2$, $A_3$ and $P_3$ remain constant. The pressure differential between the first chamber 11 and the second chamber 13 is therefore also substantially constant and is substantially independent of downstream pressure fluctuations external to the flow regulator valve as long as $A_1 \approx A_2$ ($A_1$ is substantially equal to $A_2$). By "substantially equal to" it is meant that $A_1$ is within ±5% of $A_2$. It is also apparent that, if the sole requirement of $A_1 \approx A_2$ is met, the valve of the present invention is not limited to a "small valve" valve, but instead may be of any size and still be independent of upstream pressure fluctuations. Preferably the valve of the present invention has a bore 5 with a cross-sectional area between 1 in$^2$ and 600 ft$^2$.

The flow regulator valve of the present invention operates as follows. Fluid passes through inlet port 17 at pressure $P_1$ and into cavity 15 of secondary body 3. This fluid then passes through reference opening 53, into reference pressure passage 21, into first chamber 11 of bore 5 at pressure $P_1$ and exerts force on area $A_1$ of piston 9, $A_1$ being defined in equation (1), above.

Fluid from inlet port 17 at pressure $P_1$ also passes through inlet flow throttle 35, which regulates the fluid flow. This fluid then passes into second chamber 13 of bore 5, which has a pressure $P_2$ based on the flow restriction by piston end 31 in opening 25 of piston seat plate 23. Pressure $P_2$ exerts force on area $A_2$ of piston 9, $A_2$ being defined in equation (1) above. This fluid then passes through opening 25 of piston seat plate 23. After passing through opening 25, the fluid has a further reduced pressure of $P_3$, which is the outlet line pressure. The fluid at pressure $P_3$ exerts force on the relatively small area $A_3$ of piston end 9, $A_3$ being defined in equation (1), above. It is important to note that the valve of the present invention provides substantially constant flow by operating substantially independent of upstream pressure fluctuation regardless of the area of $A_3$, as long as $A_1 \approx A_2$.

At initial operation, piston end 31 seats in, and closes, opening 25 as fluid at pressure Pl enters first chamber 11 via reference pressure passage 21 and forces piston 9 downwards. Inlet flow throttle 35 is adjusted to attain a desired flow rate and fluid enters second chamber 13. Piston end 31 is unseated from opening 25 and piston 9 moves upwards to an equilibrium position where the force of the fluid pressure $P_1$ on piston area $A_1$ equals the force of the fluid pressure $P_2$ on piston area $A_2$ plus the spring force of springs 27; the force of the fluid pressure $P_3$ on piston end 31 area $A_3$ being essentially negligible. This equilibrium condition, based on the effective flow cross section of opening 25 as determined by the interaction of piston end 31 in opening 25, maintains a constant pressure differential between $P_1$ of first chamber 11 and $P_2$ of second chamber 13.

The first embodiment of a system using the flow regulating valve of the present invention is a coil-type piping system. A conventional coil-type piping system used in heating, air conditioning and using chilled water and hot water is shown in FIG. 3.

The valve of the present invention functions over a wide operating range (for example, 0.1–10,000 gallons per minute) in both low pressure (approximately 1–100 psi) and high pressure (approximately up to 20,000 psi) environments.

Preferably, the valve of the present invention allows the establishment and maintenance of precise flow rates and also provides accurate, direct flow rate readings. Therefore, in the preferred embodiment of the present invention, pressure line 52, measuring pressure $P_1$, is connected to cavity 15. Pressure line 54, measuring pressure $P_2$ is connected to bore 5 below piston 9. Optionally, pressure line 56 connected to outlet port 7 can be employed to measure outlet flow pressure $P_3$. Connected to each of pressure line 52 and pressure line 54 are pressure measurement devices (not shown). The pressure measurement devices may be pressure gauges which can be read by the operator. Alternatively, pressure measurement devices may be solid state pressure measurement sensors known in the art which transmit an electrical signal based on line pressure to a central processing unit (CPU) of a personal computer (not shown).

Optionally, attached to shaft 39 by coupling 58 is inlet flow control motor 60. Inlet flow control motor 60 is preferably a direct digital control (DDC) motor which can precisely rotate shaft 39 due to the low torque associated with inlet flow throttle 35 as discussed above. Inlet flow rate is controlled by the rotation of control plate 43 with respect to back plate 49 as shaft 39 is rotated either manually or by inlet flow control motor 60. Inlet flow control motor 60, being preferably a DDC motor, may be calibrated with respect to the amount of electrical power required by inlet flow control motor 60 to rotate shaft 39 and control plate 43 a predetermined angular amount in relation to back plate 49, for example, one degree. The angular orientation of control plate 43 is also calibrated in relation to back plate 49 such that the overlap of control plate opening 47 of control plate 43 and hole 51 of back plate 49 varies the area of throttle opening 19 a desired amount and results in a known flow rate at a known pressure drop, or flow coefficient ($C_v$) value. For example, a flow coefficient ($C_v$) of 10 equals a 10 gallon per minute flow at a pressure drop of 1 psi. Indicia 62, radially disposed on cover plate 37 to denote 0° to 180° orientation, and indicator 64 on rotatable shaft 39, provide indication of the angular orientation of control plate 43 and control plate opening 47 relative to back plate 49 and hole 51.

In a first embodiment employing the valve of the present invention to establish, determine and maintain a desired flow rate Q, manual rotation of shaft 39 and control plate 43 is employed to first produce a specific area of throttle opening 19 in order to obtain a desired flow rate Q before fluid flow is initiated, and to subsequently modify, based on pressure measurements, the area of throttle opening 19 after fluid flow through the valve occurs in order to maintain desired flow rate Q'.

Fluid flow is derived from the following equation:

$$Q = C_v \sqrt{\frac{\Delta P}{Sg}} \qquad (6)$$

where
Q=flow rate (gallons per minute)
$C_v$=flow coefficient
p=pressure differential across the value ($P_2-P_1$, in psi)
Sg=specific gravity of the fluid.

To initiate flow of a specific rate, the operator can obtain the throttle opening 19 area required to provide a desired flow rate Q by solving the above equation for $C_v$. The plurality of angular relationships (in degrees) between control plate 43 and back plate 49 have previously been documented to provide $C_v$ values for each degree of rotation of control plate 43 with respect to back plate 49. This calibration is preferably maintained in graphic or tabular form, and a different graph or table would be used for each of a plurality of different combinations of control plate 43 and back plate 49. Thus, once the $C_v$ value is derived from equation (6), the operator, after consulting the graph or table, can rotate shaft 39 and control plate 43 the desired number of degrees (e.g., 30°) to provide a throttle opening 19 area satisfying the calculated $C_v$ value.

The $C_v$ value required is calculated as follows based on equation (6). Desired flow rate Q is, of course, known. Specific gravity, Sg, is a constant. The $\Delta P$ value is obtained from a table or graph which provides $\Delta P$ values, (in pounds per square inch, for example) versus the spring force values of springs 27. This graph or table is based on force balance equations known in the art and on the fact that the inlet pressure $P_1$ and outlet pressure $P_3$ of the system employing the valve are predetermined or approximate; the dimensions and tolerances of the specific valve chosen for the system being dependent on these system pressures $P_1$ and $P_3$. After equation (6) is solved for $C_v$, the operator consults the $C_v$ versus degree of control plate rotation graph or table described previously to ascertain the number of degrees shaft 39 and control plate 43 must be rotated to obtain desired flow rate Q.

After fluid flow has been initiated in the first embodiment, the actual fluid flow rate Q' can be determined and, if necessary, modified to equal the desired fluid flow rate Q in one of two ways. First, the operator reads pressure $P_1$ in pressure line 52 with a first pressure gauge, and reads pressure $P_2$ in pressure line 54 with a second pressure gauge. Subtracting the pressure reading of the second gauge from that of the first pressure gauge provides actual $\Delta P'$ ($P_2-P_1$). Then, the operator solves for Q (or in the case, Q') to obtain the actual flow rate.

If it is apparent to the operator that actual $\Delta P'$ does not equal anticipated $\Delta P$, and thus actual Q' does not equal desired Q, then the operator can alter the area of throttle opening 19 to obtain desired flow rate Q by employing $\Delta P'$ and Q in equation (6) and solving for a new $C_v$ value, $C_{v'}$. The operator then consults the above mentioned $C_v$ versus degree of control plate rotation table or chart to obtain the required rotation of control plate 43 relative to back plate 49.

The second manner in which the present embodiment may be employed to calculate actual flow rate Q' and, if necessary, modify Q' to equal desired flow rate Q employes pressure line 56. A pressure gauge attached to pressure line 56 reads pressure $P_3$. A look-up table or graph known in the art lists $\Delta P$ values (or P' in this case) versus $P_3$ values for the valve being employed in the system. The operator consults this table or graph to ascertain $\Delta P'$ based on the known $P_3$ value (provided: $P_1 \geq P_3 + P'$). The procedure just described above for calculating Q', and then $C_{v'}$, with equation (6) and modifying the area of throttle opening 19 to obtain the desired flow rate of Q may then be employed.

In a second embodiment employing the valve of the present invention to establish, determine and maintain a desired flow rate Q, rotation of shaft 39 and control plate 43 with respect to back plate 49 is performed by direct digital inlet flow control motor 60, as opposed to manual operation. The establishment of desired flow Q, the measurement of actual flow Q' and the adjustment of the area of throttle opening 19 such that Q' equals Q are performed in the manner described above pertaining to manual valve operation, with the following exceptions.

As previously stated, the amount of electrical power required for inlet flow control motor 60 to rotate shaft 39 and control plate 43 a predetermined angular amount (for example, one degree) is calibrated beforehand. This data is documented in tabular or graphic form, listing electrical power requirement versus degree of control plate rotation. Thus, after the operator has obtained the degree value of control plate rotation in the manner previously described, the value of the electrical power required can be inputted into DDC inlet flow control motor 60 by the operator after consulting this graph or chart. Preferably, however, DDC inlet flow control motor 60 includes power control circuitry known in the art which will control the electrical power to DDC inlet flow control motor 60. This control by the control circuitry is based on entry by the operator into the power control circuitry of the desired amount (degree value) that shaft 39 and control plate 43 are to be rotated. The power control circuitry processes this data pertaining to shaft 39 and control plate 43 rotation and provides the appropriate electrical power to DDC inlet flow control motor 60. Power control circuitry has been calibrated for use of the specific DDC inlet flow control motor employed with the particular shaft 39 and control plate 43, thus dispensing with the requirement for the above mentioned electrical power versus degree of control plate rotation table or graph.

In a third embodiment employing the valve of the present invention to establish, determine and maintain a desired flow rate, the above DDC inlet flow control motor is employed along with a personal computer (not shown) having a central processor and associated memory.

Attached to pressure line 52, measuring $P_1$, and pressure line 54, measuring $P_2$, are pressure measurement devices described previously as pressure transducers which may be solid state pressure measurement sensors able to transmit electrical signals to the CPU as a function of line pressure.

The computer is programmed with an algorithm that instructs the computer to calculate the $C_v$ value based on equation (6). Before fluid flow is initiated, the user inputs the desired flow rate Q and the specific gravity (Sg) of the fluid into the computer via a keyboard or the like. The user also inputs the $\Delta P$ value into the computer, which the user has located in previously described $\Delta P$ versue spring force value table or graph previously derived for the specific valve employed. Preferably, however, this $\Delta P$ versus spring force information is stored in the memory of the computer, and the computer memory stores this information for a plurality of values having varied dimensions and tolerances. If the $\Delta P$ versus spring force information is stored in the computer memory, the operator does not input the $\Delta P$ value, but instead inputs a code for the valve type employed to access the correct bank of data, and then inputs the valve spring force, which is based on the size and quantity of springs 27. The CPU then derives the appropriate $\Delta P$ value for use in equation (6).

After the above information is input into the computer by the operator, the CPU processes the data and solves equation (6) for $C_v$, Sg, Q and $\Delta P$ being known. Based on this $C_v$ value, the computer derives a degree of control plate rotation value by accessing a bank of data stored in memory equivalent to the previously discussed graph or table listing $C_v$ values versus degree of control plate rotation values for the specific control plate 43 and back plate 49 being used in the system. It is apparent the data may be stored in memory for a plurality of $C_v$ values versus degree of control plate rotation values. Each data bank will contain data for one of a plurality of control plate 43 and back plate 49 combinations having various control plate opening 47 and hole 51 shapes. In order for the computer to access the correct bank of data for the specific control plate/back plate combination being used, the operator would have entered a predetermined code designation into the computer prior to data processing by the computer.

After the computer derives the value for the degree of rotation of the control plate 43 relative to back plate 49, the computer outputs a control signal to the power control circuitry of DDC inlet flow control motor 60 denoting the degree of control plate rotation value. As discussed above, the power control circuitry controls the amount of electrical power to be supplied to DDC inlet flow control motor 60 based on this control plate rotation value. DDC flow control motor 60 thus rotates control plate 43 the required amount. Alternatively, the function power control circuitry can be performed by the central processor of the personal computer. In this case, the computer would output a signal to the DDC inlet flow control motor denoting the current of electrical power to be used.

After fluid flow has been established, the computer receives input signals denoting $P_1$ values and $P_2$ values from the solid state pressure transducers connected to pressure lines 52 and 54, respectively. The computer processes these signals to derive an actual $\Delta P'$ value, $P_2 - P_1$. Then, the computer derives an actual flow value $Q'$ by substituting the actual pressure differential value $\Delta P'$ for previously entered $\Delta P$ in equation (6), Sg and $C_v$ having been previously inputted. This actual flow value $Q'$ can be displayed on an LCD or LED digital meter known in the art.

Next, the computer maintains the desired flow rate Q by solving for $C_v$ (now actual flow coefficient $C_v'$) in equation (6) based on the desired flow rate Q value, or fluid+specific gravity Sg) and the actual pressure differential $\Delta P'$ value. After the $C_v'$ value is obtained, the computer undertakes the previously mentioned processing steps required to cause rotation of control plate 43 by DDC inlet flow control motor 60.

In this conventional system, supply pipe 59 carries fluid to a coil pipe unit 61. From coil pipe unit 61, the fluid passes to a return pipe 63. Circulation unit 65 on supply pipe 59 circulates the fluid in the coil type piping system. If the fluid is a gas, the circulating unit 65 will often be a pressure tank. If the fluid is a liquid, the circulating unit 65 will often be a pump. Shut-off valves 67 on both supply pipe 59 and return pipe 63 provide isolation of the control valves and coils for maintenance and service. A sensor 69 preferably adjacent to coil pipe unit 61 senses variable values of, for example, temperature, pressure or humidity and signals a motor (not shown) to adjust inlet flow throttle 35 of control valve 68 to maintain the desired temperature or pressure or other control parameter. In supply pipe 59 and/or return pipe 63, balancing valve 71 is needed to set the maximum flow rate through the coil pipe unit 61. Also in supply pipe 59 and/or return pipe 63, differential pressure valve 73 is located upstream from control valve 68 to reduce the pressure to control valve 68. Without this differential pressure valve 73, the control valve would not control flow accuracy as the pressure fluctuates in the supply pipe 59.

As shown in FIG. 4, the coil-type piping system of the present invention shares the following elements with the conventional coil-type piping system: supply pipe 59, coil pipe unit 61, return pipe 63, circulation unit 65, shut-off valve 67, and sensor 69. However, unlike the conventional coil-type piping system, the coil-type piping system of the present invention uses the flow regulating valve 75, described above, in the supply pipe 59 and/or the return pipe 63. When the flow regulating control valve 75 is employed, balancing valve 71, and differential pressure valve 73 are not needed. Neither a balancing valve nor a differential pressure valve are employed because valve 75 is pressure independent and will provide a relatively constant flow regardless of high inlet pressure fluctuations.

The second embodiment of a system using the flow regulating valve of the present invention is a diversifying campus-type piping system, also called a primary-secondary diversifying piping system. A conventional campus-type piping system, or primary-secondary piping system, for use in hot water and chilled water piping systems is shown in FIG. 5. In this conventional system, a supply pipe 83 is connected to a central plant 79 having a circulation unit 81 such as a pump. A return pipe 77 is also connected to central plant 79. A plurality of destination points 85, such as buildings or heating or cooling coils within buildings, for example, are attached to both the supply pipe 83 and the return pipe 77 by inlet piping 87b and outlet piping 87a. Destination points 85 may include either coil piping or a secondary piping system. Secondary circulation unit 88 provides fluid circulation within the coil piping or the secondary piping system. Control valve 90 on outlet passage 87a controls fluid flow rate. Balancing valves 89 on inlet piping 87b and/or outlet piping 87a are needed to set the maximum flow rate that is required for that piping loop. Also on inlet piping 87b and/or outlet piping 87a, differential pressure valves 91 are required to limit the pressure on the control valve 68. Relief pressure valve 92 limits the amount of pressure in the system and relieves the excess pressure through the return pipe 77.

In this conventional system, the supply pipe 83 and return pipe 77 are sized to receive a volume of fluid flow equivalent to the sum of the maximum desired fluid flow rates for each destination point 85. In actual operation, however, all of destination points 85 do not require maximum fluid flow at the same point in time.

As shown in FIG. 6, the diversifying campus-type piping system, or primary-secondary diversifying piping system, of the present invention shares the following elements with the conventional campus-type piping system: supply pipe 83, central plant 79, circulation unit 81, return pipe 77, destination points 85, inlet piping 87b, outlet piping 87a, and secondary circulation unit 88. However, unlike the conventional campus-type piping system, the diversifying campus-type piping system of the present invention uses the flow controller valve 93, described above, in the inlet piping 87b, and/or the outlet piping 87a of the destination points 85. When the flow regulating valve 93 is used, balancing valve 89, differential pressure valve 91 and control valve 90 are not needed. A balancing valve is not needed because the flow regulating valve 93 is substantially pressure independent. A differential pressure valve is not used because flow regulating valve 93 will operate accurately regardless high and/or fluctuating inlet pressures. A relief valve is not needed to release excess pressure.

The diversifying campus-type piping system of the present invention, unlike the traditional campus-type system, does not use supply pipes and return pipes sized to receive a volume of fluid flow equivalent to the sum of the maximum desired fluid flow rates for each destination point 85. Instead, the diversifying campus-type piping system, due to flow regulating valve 93, uses a supply pipe 77 and a return pipe 83 sized to contain only the actual maximum flow rate which occurs at any single point in time on the supply pipe 83 or return pipe 77, not a maximum based on the sum of the maximum destination point flow rates which, in reality, do not all occur simultaneously.

In order to maintain the minimum line pressure required for operation of the diversifying campus-type piping system, differential pressure sensor 95 is located near the destination point 85 farthestmost from central plant 79 along outlet piping 87a. Differential pressure sensor 95 maintains the minimum differential pressure at this farthestmost point of system. Differential pressure sensor 95 senses the line pressure at this location and signals a motor (not shown) to activate and deactivate, or to adjust the speed of the circulation unit 81 and/or the secondary circulation units 88.

Figure 7:
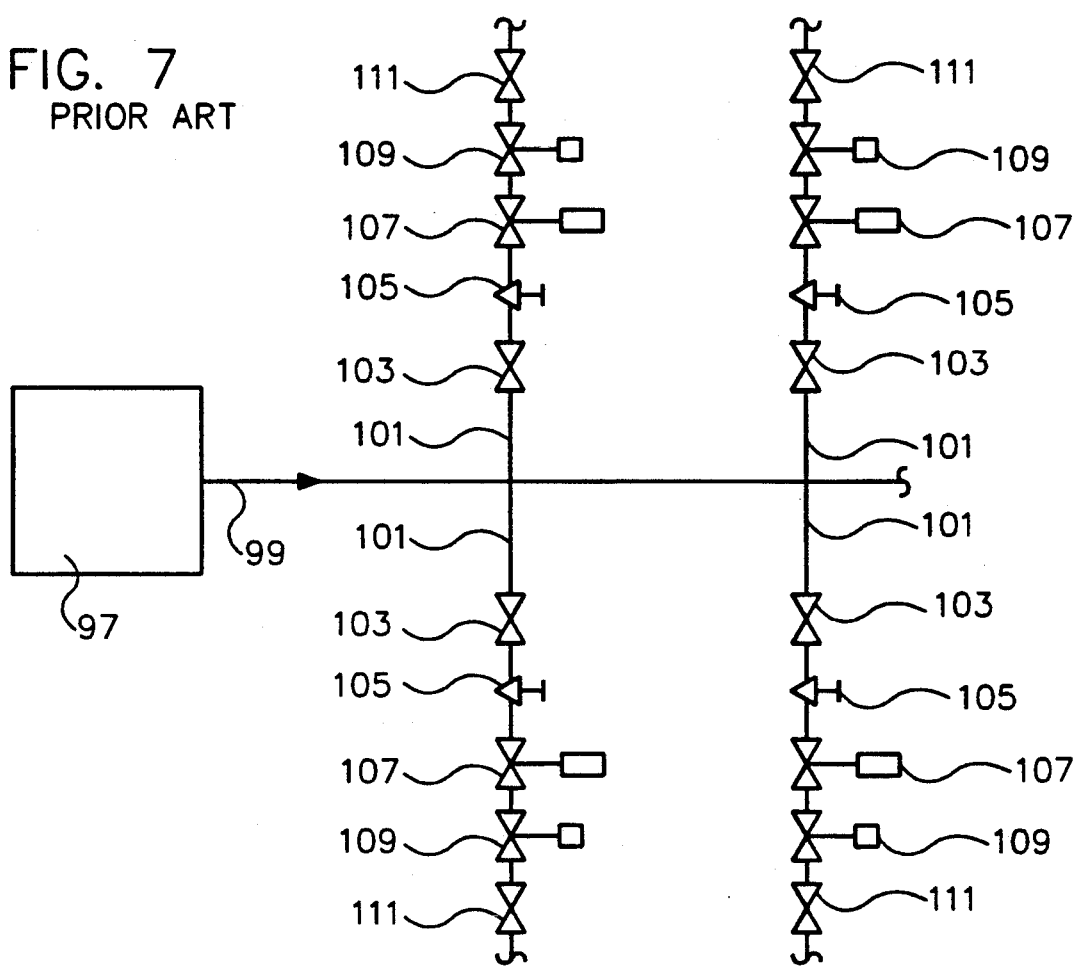
FIG. 7 is a schematic view of a conventional pressure source piping system.

The third embodiment of a system using the flow regulating valve of the present invention is a pressure source piping system. A conventional pressure source piping system for use in piping natural gas, or steam system for example, is shown in FIG. 7. In this conventional system a pressure source 97, such as a pressure tank, for example, is connected to a supply main 99. A plurality of arterial pipes 101 branch from the supply main 99 and feed a plurality of destination points (not shown). Each of arterial pipes 101 preferably has a shut-off valve 103 adjacent to the connection point of supply main 99 and arterial pipe 101. A balancing valve 105, differential pressure valve 107, control valve 109 and second shut-off valve 111 are sequentially located on arterial pipe 101 downstream from shut-off valve 103.

Figure 8:
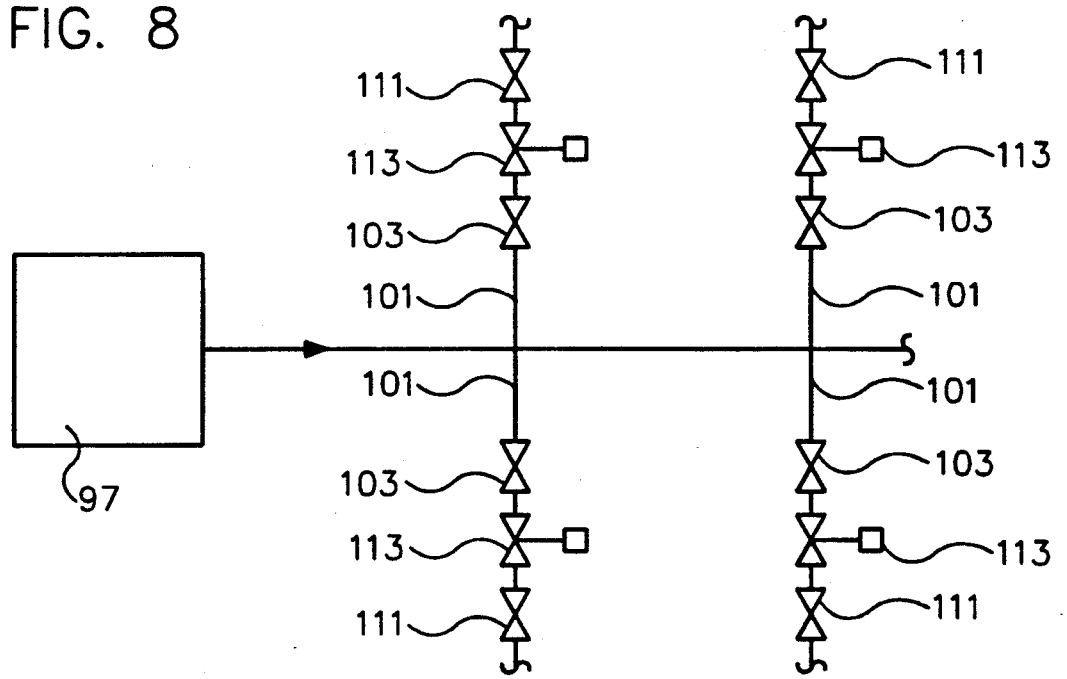
FIG. 8 is a schematic view of a pressure source piping system having the flow regulating valve of the present invention.

The pressure source piping system employing the flow regulating valve of the present invention is shown in FIG. 8. This system, like the conventional pressure source piping system, has a pressure source 97, supply main 99, arterial pipes 101 and shut-off valves 103 and 111. However, unlike the conventional system, the pressure source piping system of the present invention uses flow regulating valve 113, described above, on each arterial pipe 101 in place of balancing valve 107 and differential pressure valve 07. These two conventional elements are not required based on the same reasons elaborated in explanation of the coil-type piping system of FIG. 4 and the diversifying campus-type piping system of FIG. 6.

While particular embodiments of the present invention have been described in some detail above, changes and modifications may be made in the illustrated embodiments without departing from the form or spirit of the invention. It is therefore intended that the following claims cover all equivalent modifications and variations as fully within the scope of the invention as defined by the claims.

I claim:

1. A pressure independent fluid flow regulating valve comprising:

a valve body having an inlet and an outlet forming a flow passage through said valve body;

a piston mounted in a bore intersecting said flow passage, said piston dividing said bore into first and second chambers, said inlet and said outlet connected with said second chamber;

outlet varying means on said piston for varying the cross-sectional area of said outlet based on the pressure differential between said first chamber and said second chamber;

a reference pressure passage connected to said inlet and to said first chamber of said bore;

an adjustable throttle means disposed in said flow passage for varying the cross-sectional area of said flow passage;

spring means biasing said piston toward said reference pressure passage; and means for guiding reciprocation of said piston in said bore, said means for guiding reciprocation including an elongate member in said bore and an opening in registration with said elongate member whereby relative reciprocation between said elongate member and said opening occurs upon piston reciprocation.

2. The valve of claim 1 wherein said adjustable throttle means includes a plate in said flow passage for rotation about an axis substantially normal thereto, said plate having an opening, said plate cooperating with a fixed opening in said flow passage such that rotation of said plate varies the effective flow cross-section through said plate opening and said fixed opening.

3. The valve of claim 2, said valve capable of establishing, maintaining and measuring a desired fluid flow rate, said valve further comprising:

at least one fluid pressure measurement line; and fluid pressure measurement means on each of said fluid pressure measurement lines for measurement of a pressure value in said valve such that a fluid flow rate can be derived.

4. The valve of claim 3 wherein said fluid pressure measurement line is connected to said outlet of said valve body for measurement of an outlet pressure value $P_3$.

5. The valve of claim 3 wherein one of said fluid pressure measurement lines is connected to said inlet of said valve body for measurement of an inlet pressure value $P_1$, and another of said fluid pressure measurement lines is connected to said second chamber of said bore for measurement of a second chamber pressure value $P_2$.

6. The valve of claim 3 wherein said fluid pressure measurement means is a pressure gauge.

7. The valve of claim 3 further comprising:
a motor means for adjustment of said plate of said adjustable throttle means for varying the cross-sectional area of said flow passage to establish a predetermined fluid flow rate and to maintain the predetermined fluid flow rate in relation to the fluid flow rate determined from the pressure value in said valve as measured by said fluid pressure measurement line and said fluid pressure measurement means.

8. The valve of claim 7 wherein said motor means is a direct digital control motor.

9. The valve of claim 7 wherein one of said fluid pressure measurement lines is connected to said inlet of said valve body for measurement of an inlet pressure $P_1$, and another of said fluid pressure measurement lines is connected to said second chamber of said bore for measurement of a second chamber pressure value $P_2$, said fluid pressure measurement means are solid state pressure measurement sensors, and said value is associated with a computer means comprising:
a keyboard input means, a processor means, a memory means, and a display means;
said keyboard input means for inputting a desired fluid flow rate value (Q), a fluid specific gravity (Sg), and a desired pressure differential value ($\Delta P$);
said memory for storing a plurality of data comparing fluid flow coefficient values to degree of control plate rotation values and for storing a plurality of data comparing degree of control plate rotation values to motor means electrical power values;
said processor means deriving a desired fluid flow coefficient value ($C_v$) based on said desired fluid flow rate (Q), on said fluid specific gravity (Sg), and on said desired pressure differential value ($\Delta P$), said processor means deriving a first desired degree of control plate rotation value based on said desired fluid flow coefficient value ($C_v$) and on said plurality of data comparing fluid flow coefficient values to degree of control plate rotation values, said processor means deriving a first desired motor means electrical power value based on said first desired degree of control plate rotation value and on said data comprising degree of control plate rotation values to motor means electrical power values, said computer means outputting a first electrical power control signal based on said first desired motor means electrical power value to said motor means for actuation of said motor means to rotate said plate in said flow passage to establish a desired fluid flow rate (Q);
said processor means receiving electrical signals from said solid state pressure measurement sensors based on said pressure value $P_1$ and said pressure value $P_2$, said processor means deriving an actual pressure differential value ($\Delta P'$) based on said pressure value $P_1$ and said pressure value $P_2$, said processor means deriving an actual fluid flow value (Q') based on said actual pressure differential value ($\Delta P'$) on said fluid specific gravity (Sg), and on said desired fluid flow coefficient ($C_v$), said processor means deriving an actual fluid flow coefficient value ($C_v'$) based on said desired flow rate value (Q), on said fluid specific gravity (Sg), and on said actual pressure differential ($\Delta P'$), said processor means deriving a second desired degree of control plate rotation value based on said actual fluid flow coefficient value ($C_v'$) and on said plurality of data comparing fluid flow coefficient values to degree of control plate rotation values, said processor means deriving a second desired motor means electrical power value based on said second desired degree of control plate rotation value and on said data comparing degree of control plate rotation values to motor means electrical power values, said computer means outputting a second electrical power control signal based on said second desired motor means electrical power value to said motor means for actuation of said motor means to rotate said plate in said flow passage to maintain desired fluid flow rate (Q);
said display means displaying at least one of said Q, Sg, $C_v$, $\Delta P$, $P_1$, $P_2$, Q', $C_v'$ and $\Delta P'$ values.

10. The valve of claim 1 wherein said reference pressure passage includes a flow restriction means.

11. The fluid flow regulating valve of claim 1 wherein said means for guiding reciprocation of said piston in said bore comprises:
an elongate member on said piston and intersecting said outlet; and
a collar attached to said valve body adjacent said outlet, said collar having an opening oriented to receive said elongate member whereby reciprocation of said piston in said bore is guided by reciprocation of said elongate member in said opening of said collar.

12. The fluid flow regulating valve of claim 1 wherein said means for guiding reciprocation of said piston in said bore comprises:
an elongate member fixed to said valve body and passing through said first chamber and said second chamber; and
an opening through said piston aligned to receive said elongate member whereby reciprocation of said piston in said bore is guided by reciprocation of said piston along said elongate member.

13. A pressure independent fluid flow regulating valve comprising:
a valve body having an inlet and an outlet forming a flow passage through said valve body;
a piston mounted in a bore intersecting said flow passage, said piston dividing said bore into first and second chambers, said inlet and said outlet connected with said second chamber,
outlet varying means on said piston for varying the cross-sectional area of said outlet based on the pressure differential between said first chamber and said second chamber;
a narrowed reference pressure control passage connected to said inlet and to said first chamber of said bore for controlling responsiveness of said valve during fluctuation of pressure at said inlet, said narrowed reference pressure control passage having an area less than one percent of the surface area of said piston;
an adjustable throttle means disposed in said flow passage for varying the cross-sectional area of said flow passage; and
spring means biasing said piston toward said reference pressure passage.

14. A fluid coil piping system comprising:

a supply pipe having a shut-off valve;
a return pipe having a shut-off valve;
a coil pipe connected to said supply pipe and to said return pipe;
a means for circulating gas or fluid through said supply pipe, said return pipe, and said coil pipe;
a pressure independent fluid flow regulating a valve comprising
  a valve body having an inlet and an outlet forming a flow passage through said valve body; a piston mounted in a bore intersecting said flow passage, said piston dividing said bore into first and second chambers, said inlet and said outlet connected with said second chamber; outlet varying means on said piston for varying the cross-sectional area of said outlet based on the pressure differential between said first chamber and said second chamber; a reference pressure passage connected to said inlet and to said first chamber of said bore; an adjustable throttle means disposed in said flow passage for varying the cross-sectional area of said flow passage; and spring means biasing said piston toward said reference pressure passage; means for guiding reciprocation of said piston in said bore, said means for guiding reciprocation including an elongate member in said bore and an opening registration with said elongate member and said opening occurs upon piston reciprocation; and
a measurement means controlling the actuation of said fluid flow regulating valve.

15. The fluid coil piping system of claim 14 wherein said means for calculating fluid is a pump.

16. The fluid coil piping system of claim 14 wherein said means for circulating fluid is a pressure source of fluid.

17. The fluid coil piping system of claim 14 wherein said fluid flow regulating valve is in said supply pipe.

18. The fluid coil piping system of claim 14 wherein said fluid flow regulating valve is in said return pipe.

19. The fluid coil piping system of claim 14 wherein said measurement means measures temperature.

20. The fluid coil piping system of claim 14 wherein said measurement means measures pressure.

21. The fluid coil piping system of claim 14 wherein said measurement means measures humidity.

22. A diversifying fluid piping system for a plurality of destination points comprising;
  a supply main connected to each of said destination points, said supply main sized to accommodate a flow rate which is less than the sum of the maximum individual flow rates for said destination points;
  a return main connected to each of said destination points, said return main sized to accommodate a flow rate which is less than the sum of the maximum desired flow rates for all of said destination points;
  a means for circulating fluid through said supply main and said return main;
  a pressure sensing means on said supply main adjacent to the destination point farthest most from said means for circulating fluid, said pressure sensing means controlling said means for circulating fluid to maintain a predetermined minimum line pressure at said destination point farthest most from said pumping means; and
  a plurality of pressure independent fluid flow regulating valves, each of said valve comprising
    a valve body having an inlet and an outlet forming a flow passage through said valve body; a piston mounted in a bore intersecting said flow passage, said piston dividing said bore into first and second chambers, said inlet and said outlet connected with said second chamber; outlet varying means on said piston for varying the cross-sectional area of said outlet based on the pressure differential between said first chamber and said second chamber; a reference pressure passage connected to said inlet and to said first chamber of said bore; an adjustable throttle means disposed in said flow passage for varying the cross-sectional area of said flow passage; and spring means biasing said piston toward said reference pressure passage; and means for guiding reciprocation of said piston in said bore, said means for guiding reciprocation including an elongate member in said bore and an opening in registration with said elongate member whereby relative reciprocation between said elongate member and said opening occurs upon piston reciprocation.

23. The diversifying fluid piping system for a plurality of destination points of claim 22 wherein said means for circulating fluid is a pump.

24. The diversifying fluid piping system for a plurality of destination points of claim 22 wherein said means for circulating fluid is a pressure source of fluid.

25. The diversifying fluid piping system for a plurality of destination points of claim 22 further comprising a coil pipe for each of said destination points connecting said supply main to said return main.

26. The diversifying fluid system for a plurality of destination points of claim 22 further comprising a secondary piping system for each of said destination points connecting said supply main to said return main.

27. The diversifying fluid system for a plurality of destination points of claim 22 wherein each of said valves is between one of said destination points and said supply main.

28. The diversifying fluid system for a plurality of destination points of claim 22 wherein each of said valves is between one of said destination points and said return main.

29. A pressure source piping system for a plurality of destination points comprising:
  a pressure source;
  a supply main connected said pressure source;
  a plurality of arterial pipes connected to said supply main; and
  a pressure independent fluid flow regulating valve on each of said arterial pipes between said supply main and said destination point, said fluid flow regulating valve comprising:
    a valve body having an inlet and an outlet forming a flow passage through said valve body; a piston mounted in a bore intersecting said flow passage, said piston dividing said bore into first and second chambers, said inlet and said outlet connected with said second chamber; outlet varying means on said piston for varying the cross-sectional area of said outlet based on the pressure differential between said first chamber and said second chamber; a reference pressure passage connected to said inlet and to said first chamber of said bore; an adjustable throttle means disposed in said flow passage for varying the cross-sectional area of said flow passage; and spring means biasing said piston toward said reference pressure passage; and means for guiding reciprocation of said piston in said bore, said means for guiding reciprocation including an elongate member in said bore and an opening in registration with said elongate member whereby relative reciprocation between said elongate member in said opening occurs upon piston reciprocation.

30. A pressure independent fluid flow regulating valve comprising:

a valve body having an inlet and an outlet forming a flow passage, through said valve body;

a piston mounted in a bore intersecting said flow passage, said piston dividing said bore into first and second chambers, said inlet and said outlet connected with said second chamber;

outlet varying means on said piston for varying the cross-sectional area of said outlet based on the pressure differential between said first chamber and said second chamber;

a reference pressure passage connected to said inlet and to said first chamber of said bore;

an adjustable throttle means disposed in said flow passage for varying the cross-sectional area of said flow passage, said adjustable throttle means including a plate in said flow passage for rotation about an axis substantially normal thereto, said plate having an opening, said plate cooperating with a fixed opening in said flow passage such that rotation of said plate varies the effective flow cross-section through said plate opening and said fixed opening;

spring means biasing said piston toward said reference pressure passage, said cross-sectional area of said outlet being substantially independent of pressure variations external to said valve;

a first fluid pressure measurement line connected to said inlet of said valve body for measurement of an inlet pressure value $P_1$, and a second fluid pressure measurement line connected to said second chamber of said bore for measurement of a second chamber pressure value $P_2$; and fluid pressure measurement means on each of said fluid pressure measurement lines for measurement of a pressure value in said valve such that a fluid flow rate can be derived.

31. A pressure independent fluid flow regulating valve comprising:

a valve body having an inlet and an outlet forming a flow passage through said valve body;

a piston mounted in a bore intersecting said flow passage, said piston dividing said bore into first and second chambers, said inlet and said outlet connected with said second chamber;

outlet varying means on said piston for varying the cross-sectional area of said outlet based on the pressure differential between said first chamber and said second chamber;

a reference pressure passage connected to said inlet and to said first chamber of said bore;

an adjustable throttle means disposed in said flow passage for varying the cross-sectional area of said flow passage;

spring means biasing said piston toward said reference pressure passage; and means for guiding reciprocation of said piston in said bore, said means for guiding reciprocation including an elongate member on said piston and intersecting said outlet, and a collar attached to said valve body adjacent said outlet, said collar having an opening oriented to receive said elongate member whereby reciprocation of said piston in said bore is guided by reciprocation of said elongate member in said opening of said collar.

32. A pressure independent fluid flow regulating valve comprising:

a valve body having an inlet and an outlet forming a flow passage through said valve body;

a piston mounted in a bore intersecting said flow passage, said piston dividing said bore into first and second chambers, said inlet and said outlet connected with said second chamber;

outlet varying means on said piston for varying the cross-sectional area of said outlet based on the pressure differential between said first chamber and said second chamber;

a reference pressure passage connected to said inlet and to said first chamber of said bore;

an adjustable throttle means disposed in said flow passage for varying the cross-sectional area of said flow passage;

spring means biasing said piston toward said reference pressure passage; and means for guiding reciprocation of said piston in said bore, said means for guiding reciprocation including an elongate member fixed to said valve body and passing through said first chamber and said second chamber, and an opening through said piston aligned to receive said elongate member whereby reciprocation of said piston in said bore is guided by reciprocation of said piston along said elongate member.

33. A pressure independent fluid flow regulating valve comprising:

a valve body having an inlet and an outlet forming a flow passage through said valve body;

a piston mounted in a bore intersecting said flow passage, said piston dividing said bore into first and second chambers, said inlet and said outlet connected with said second chamber;

outlet varying means on said piston for varying the cross-sectional area of said outlet based on the pressure differential between said first chamber and said second chamber;

a reference pressure passage connected to said inlet and to said first chamber of said bore;

an adjustable throttle means disposed in said flow passage for varying the cross-sectional area of said flow passage;

spring means biasing said piston toward said reference pressure passage; and means for guiding reciprocation of said piston in said bore, said means for guiding reciprocation including an elongate member fixed to said valve body in said first chamber of said bore, and a seat in said piston in registration with said elongate body whereby reciprocation of said piston in said bore is guided by reciprocation of said piston seat along said elongate member.

* * * * *